United States Patent [19]

Suehiro

[11] 4,122,307
[45] Oct. 24, 1978

[54] TELEPHONE VOICE FREQUENCY RESPONSE SYSTEM FOR MESSAGE RECORDING

[75] Inventor: Akio Suehiro, Yokohama, Japan

[73] Assignee: Hitachi, Ltd., Japan

[21] Appl. No.: 823,427

[22] Filed: Aug. 10, 1977

[30] Foreign Application Priority Data

Aug. 13, 1976 [JP] Japan .................................. 51-96029

[51] Int. Cl.² ............................................. H04M 1/64
[52] U.S. Cl. .................................... 179/6 R; 179/6 D; 179/6 C; 179/2 A
[58] Field of Search ................... 179/100, 1 DR, 6 D, 179/6 C, 2 A, 6 E, 6 R, 100 NC, 1 VC

[56] References Cited

U.S. PATENT DOCUMENTS

| | | | |
|---|---|---|---|
| 3,376,390 | 4/1968 | Hashimoto | 179/6 R |
| 3,651,267 | 3/1972 | Wittenberger | 179/6 R |

Primary Examiner—Bernard Konick
Assistant Examiner—Alan Faber
Attorney, Agent, or Firm—Craig & Antonelli

[57] ABSTRACT

A voice frequency response system consisting of a central voice frequency response device and a thermal unit, the central voice frequency response device including means for confirming a specific code allotted to the thermal unit, a PB signal receiver, a message drum and a trunk, and the terminal unit including a recorder recording message information transmitted from the central voice frequency response device, a PB signal oscillator, and a push button dial generating the specific code applied to the central voice frequency response device. In the system, a signal consisting of the combination of three frequencies in the voice frequency band is recorded on a portion of the message drum to be selectively applied to the terminal unit prior to transmission of important message information. The terminal unit includes a filter which detects this three-frequency signal so that the recorder is actuated by the output signal of the filter. In the terminal unit, a signal is generated in response to the normal operation of the recorder for actuating the PB signal oscillator. This PB signal is received by the PB signal receiver in the central voice frequency response device, and the central voice frequency response device detects that the recorder in the terminal unit has started its recording operation, and transmits the important message information to the terminal unit.

3 Claims, 3 Drawing Figures

TELEPHONE VOICE FREQUENCY RESPONSE SYSTEM FOR MESSAGE RECORDING

LIST OF PRIOR ART REFERENCES (37 CFR 1.56(a))

The following reference is cited to show the state of the art: U.S. Pat. No. 3,376,390.

This invention relates to a voice frequency response system for transmitting voice information utilizing a telephone line.

With the progress of the information-oriented society, the service utilizing the telephone line is increasing more and more, and the utilization of office and home telephones as means for information transmission including data communication makes possible to offer a wide variety of information serivice.

However, a telephone transmits information generally in the form of voice unless a special expensive printer or display unit is connected to the telephone. While the transmission of information in the form of voice has the advantage such as facility of message transmission, it has such a disadvantage that mishearing of a received message or miswriting of the record of the received message may sometimes provide the source of future trouble. The solution of such a problem is especially important in a system which deals with money information.

Such a problem can generally be solved by a plurality of methods. In one of these methods, all the messages exchanged between an information transmitting party and an information receiving party are recorded at the transmitting side. According to another method, the messages are recorded at the information receiving side. According to a third method, such messages are recorded at both the information transmitting side and the information receiving side. The present invention has concern with the recording of messages at the receiving side.

Devices capable of recording messages at the information receiving side have been proposed already. An example of such prior art devices is disclosed in U.S. Pat. No. 3,376,390 under the title of "TELEPHONE ANSWERING DEVICE", in which a conventional recorder is combined with an automatic telephone answering device for recording an incoming message and an outgoing message. The proposed device is such that, upon automatic initiation of the operation of the device, the outgoing message tape operates for a predetermined period and then automatically ceases to operate and, upon cessation of the operation of the outgoing message tape, the incoming message tape automatically initiates its operation. However, the proposed device is not advantageously used in a system which handles money information, because the information transmitting party cannot confirm as to whether or not the transmitted message is correctly recorded at the information receiving side. Thus, when there is a message error such as a shortage of money which is disadvantageous to the information receiving party, the receiving party will make a claim against the information transmitting party and request correction of the amount on the basis of the record. However, if there is a message error such as an excess of money which is advantageous to the information receiving party, the receiving party may insist that no record was taken and dispute a future claim put forward by the information transmitting party. This provides the source of trouble between the information transmitting and receiving parties.

It is therefore a primary object of the present invention to provide a voice frequency response system in which a recorder in an information receiving terminal unit can be reliably necessarily placed in a recording state in response to an actuating signal applied from a central voice frequency response device prior to transmission of an important message so that the message can be forcedly recorded by the recorder without regard to the intention of the information receiving party.

In accordance with the present invention, there is provided a voice frequency response system consisting of a central voice frequency response device and a terminal unit, said central voice frequency response device including means for confirming a specific code allotted to said terminal unit, and said terminal unit including means for recording voice information transmitted from said central voice frequency response device, and means for applying said specific code to said central voice frequency response device, said system comprising means disposed in said central voice frequency response device for receiving said specific code, memory means disposed in said central voice frequency response device for storing, in addition to voice information, an actuating signal of voice frequency band in a portion thereof, means disposed in said terminal unit for detecting said actuating signal, means disposed in said central voice frequency response device for selectively reading out said actuating signal from said memory means to apply said actuating signal to said terminal unit prior to transmission of required voice information to said terminal unit upon confirmation of said specific code of said terminal unit by said confirming means in said central voice frequency response device, means disposed in said terminal unit for automatically starting the operation of said recording means upon detection of said actuating signal, and means disposed in said central voice frequency response device for detecting the commencement of the operation of said recording means in said terminal unit, whereby the required voice information is transmitted to said terminal unit after the commencement of the operation of said recording means in said terminal unit has been detected in said central voice frequency response device.

Other objects, features and advantages of the present invention will become apparent from the following detailed description of a preferred embodiment thereof taken in conjunction with the accompanying drawing, in which:

FIGS. 1 and 2 show a preferred embodiment of the voice frequency response system according to the present invention, with FIG. 1 showing the structure of a central voice frequency response device which is a voice information center, and FIG. 2 showing the structure of one of a plurality of terminal units receiving the voice information service from the central voice frequency response device.

Figure 1:
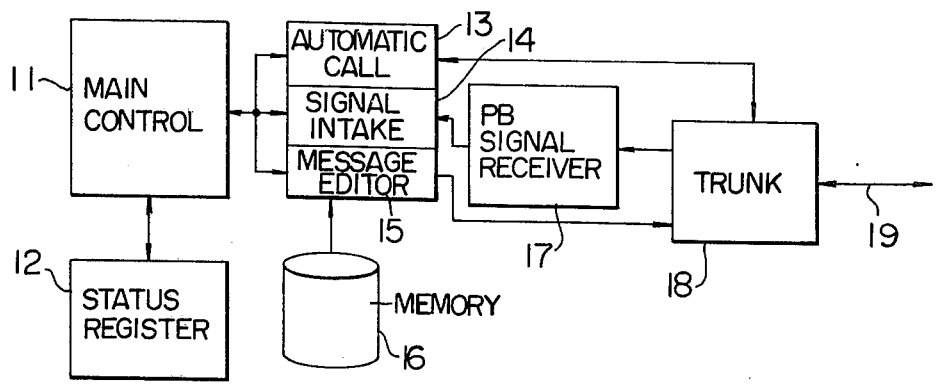
FIG. 1 is a block diagram of a preferred form of the central voice frequency response device employed in the system according to the present invention.
Figure 2:
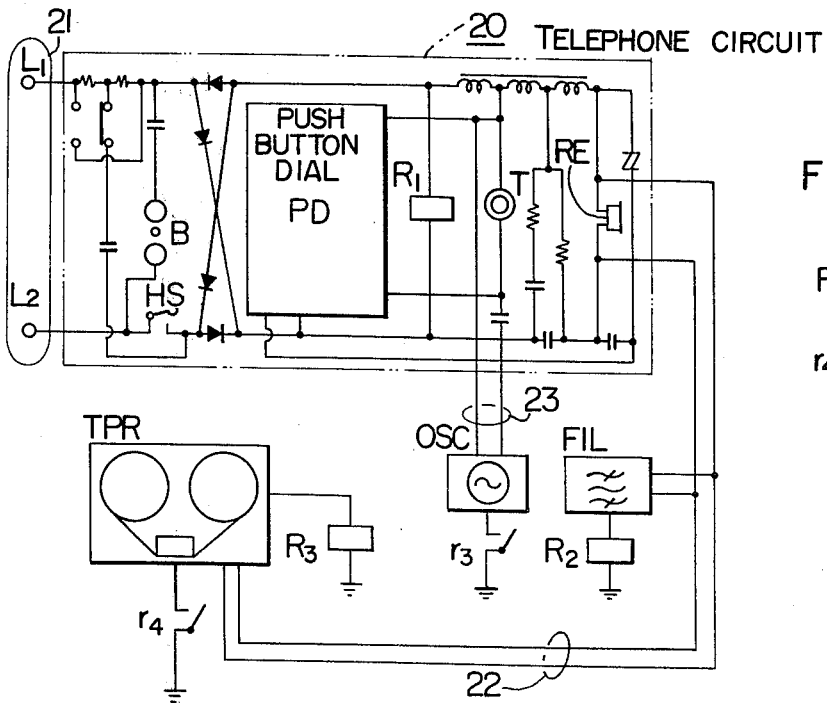
FIG. 2 is a block diagram of a preferred form of the terminal unit employed in the system of the present invention and connected to the central voice frequency response device shown in FIG. 1.

Referring to FIG. 1, the central voice frequency response device employed in the system of the present invention comprises a main control unit 11, a status supervisory or registering unit 12, an automatic calling unit 13, an incoming signal intake unit 14, a message editing unit 15, a message drum 16, a PB signal receiving unit 17, and a trunk 18. Referring to FIG. 2, the terminal unit employed in the system of the present invention comprises, in addition to a conventional push button dial (PD) telephone circuit 20, a filter FIL, an oscillator OSC, a recorder TPR, and relays $R_1$, $R_2$, $R_3$ and $R_4$ actuating the filter FIL, oscillator OSC and recorder TPR.

A starting signal is applied from an operator's panel, a computer or the like to the main control unit 11 of the central voice frequency response device shown in FIG. 1 to call a terminal unit. The main control unit 11 registers in the status registering unit 12 the program part of calling a specific terminal unit, and at the same time, applies the starting signal to the trunk 18 via the automatic calling unit 13 to loop a telephone line 19. Then, the main control unit 11 applies the telephone number of the specific terminal unit to the automatic calling unit 13. This signal of 16 Hz is sent out from the automatic calling unit 13 to the telephone line 19 via the trunk 18 to actuate the telephone switching means (not shown) thereby calling the specific terminal unit.

In the called terminal unit shown in FIG. 2, the signal of 16 Hz transmitted from the telephone switching station is applied across $L_1$ and $L_2$ of a telephone line 21 to energize a bell B. In response to the ringing of the bell B, the subscriber takes up the handset of the terminal unit. A hook switch HS is turned on to establish the loop across $L_1$ and $L_2$ of the telephone line 21. Thus, the called terminal unit is connected to the central voice frequency response device, and at the same time, the relay $R_1$ is energized to close its contact $r_1$.

The establishment of connection between the central voice frequency response device and the called terminal unit is detected in the trunk 18 of the central voice frequency response device shown in FIG. 1, and a signal indicating the set-up of connection is applied from the trunk 18 to the main control unit 11 via the automatic calling unit 13. The program part of preparing a message and transmitting it to the terminal unit is now registered in the status registering unit 12 from the main control unit 11 in response to the application of the above signal from the trunk 18. This message is, for example, as follows: "This is the ABC Bank. The balance will be reported. Dial your card number and figure code on the push button dial." In editing such a message, the addresses of the corresponding words or short sentences recorded on the message drum 16 are sequentially specified to read out the words or sentences, and the combination of the words or sentences thus read out is converted into a message signal by the message editing unit 15. Such a message signal is applied from the message editing unit 15 to the telephone line 19 via the trunk 18. This message signal is transmitted through the telephone switching means (not shown) and is applied to the terminal unit by the telephone line 21 shown in FIG. 2 so that the subscriber can hear the transmitted message from the receiver RE of the handset. The subscriber of the called terminal unit depresses then the necessary figures on the push button dial to generate a PB (push button) signal consisting of the combination of two frequencies. This PB signal is applied to the telephone line 21.

This PB signal is transmitted through the telephone switching means, telephone line 19 and trunk 18 to be received by the PB signal receiving unit 17 of the central voice frequency response device in FIG. 1. In the PB signal receiving unit 17, the PB signal is converted into a pulse signal which is applied to the incoming signal intake unit 14 and then passed to the main control unit 11. The figure input is checked in the main control unit 11, and when the figure input is correct, the next status, that is, the program part of starting the operation of the recorder TPR in the terminal unit is registered in the status registering unit 12 from the main control unit 11. At the same time, a signal of voice frequency band, for example, a three-frequency signal previously recorded on a portion of the message drum 16 is read out to be applied to the trunk 18 via the message editing unit 15.

Figure 3:
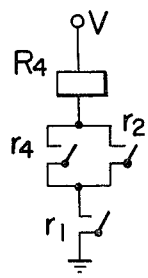
FIG. 3 is a circuit diagram of part of the relays shown in FIG. 2.

This signal is transmitted via the telephone switching means to the telephone line 21 shown in FIG. 2. The subscriber hears the tone of this three frequency signal at the receiver RE of the handset, and at the same time, the three-frequency signal is detected by the filter FIL which separates the signal from the message. The output of the filter FIL energizes the relay $R_2$. As will be readily understood from FIG. 3, the energization of the relay $R_2$ energizes the relay $R_4$, and its contacts $r_4$ are closed. As a result, the relay $R_4$ holds itself over one of its contacts $r_4$, and the recorder TPR is connected by another contact $r_4$ to ground to start its recording operation. In response to the commencement of normal recording operation of the recorder TPR, the relay $R_3$ is energized to close its contact $r_3$ thereby actuating the oscillator OSC which applies a two-frequency signal to the telephone line 21 by a cable 23. This two-frequency signal may have the same frequencies as those of one PB signal, for example the PB signal corresponding to sign "#" indicated on the push button and is generated continuously over a period of 300 ms to 500 ms.

After passing through the telephone switching means, this two-frequency signal passes through the telephone line 19 and trunk 18 to be received by the PB signal receiving unit 17 in FIG. 1. In the PB signal receiving unit 17, the two-frequency signal is converted into a pulse signal which is applied to the incoming signal intake unit 14. This signal is then applied to the main control unit 11 to be collated with the status registered already in the status registering unit 12 in order to confirm the fact that the recorder TPR in the terminal unit has normally operated. Upon confirmation of the above fact, the main control unit 11 applies an instruction signal so that important message information can be transmitted to the terminal unit. The addresses of the necessary words or short sentences constituting the important message information are sequentially specified to be read out from the message drum 16 under the control of the main control unit 11, and the information thus read out is then converted into a message signal by the message editing unit 15 to be applied to the telephone line 19 via the trunk 18.

This message signal is transmitted to the terminal unit via the telephone line 21 in FIG. 2 so that the subscriber can hear the message from the receiver RE of the handset. At the same time, the message signal is applied via a cable 22 to the recorder TPR to be recorded thereon. When the subscriber hangs up the handset upon complete reception of the transmitted message information, the hook switch HS is turned off to deenergize the relay $R_1$, and the contact $r_1$ of relay $R_1$ is opened to deenergize the relay R₄. The recorder TPR ceases to operate, and all the other elements in FIG. 2 are restored to their original state.

A message end instruction signal appears from the main control unit 11 in FIG. 1. As a result, the status registering unit 12 is reset, and the trunk 18 is released to release the loop on the telephone line 19. In this manner, all the units in FIG. 1 are restored to their original state.

It will be understood from the foregoing description that, according to the voice frequency response system of the present invention, the recorder on the information receiving side can be forcedly placed in its normal recording condition to record a message under control of the central voice frequency response device without regard to the intention of the information receiving party, although recording of such message was dependent upon the arbitrary decision or judgment of the information receiving party in the case of prior art systems of this kind. Therefore, application of the present invention to an information transmission system transmitting money and other important information is effective in preventing future trouble between the information transmitting and receiving parties.

What is claimed is:

1. A voice frequency response system consisting of a central voice frequency response device and a terminal unit, said central voice frequency response device including means for confirming a specific code allotted to said terminal unit, and said terminal unit including means for recording voice information transmitted from said central voice frequency response device, and means for applying said specific code to said central voice frequency response device, said system comprising means disposed in said central voice frequency response device for receiving said specific code, memory means disposed in said central voice frequency response device for storing, in addition to voice information, an actuating signal of voice frequency band in a portion thereof, means disposed in said terminal unit for detecting said actuating signal, means disposed in said central voice frequency response device for selectively reading out said actuating signal from said memory means to apply said actuating signal to said terminal unit prior to transmission of required voice information to said terminal unit upon confirmation of said specific code of said terminal unit by said confirming means in said central voice frequency response device, means disposed in said terminal unit for automatically starting the operation of said recording means upon detection of said actuating signal, and means disposed in said central voice frequency response device for detecting the commencement of the operation of said recording means in said terminal unit, whereby the required voice information is transmitted to said terminal unit after the commencement of the operation of said recording means in said terminal unit has been detected in said central voice frequency response device.

2. A voice frequency response system as claimed in claim 1, wherein said means for applying said specific code is a push button dial telephone circuit disposed in said terminal unit, and said specific code receiving means in said central voice frequency response device is a PB signal receiver.

3. A voice frequency response system as claimed in claim 1, wherein said actuating signal is a three-frequency signal consisting of three frequencies in the voice frequency band, and said actuating signal detecting means in said terminal unit is a filter which separates said three-frequency signal from the transmitted voice information.

* * * * *